July 20, 1965  M. J. BLICKSTEIN ETAL  3,196,331
PISTON TRIMMER CAPACITOR
Filed Oct. 22, 1962
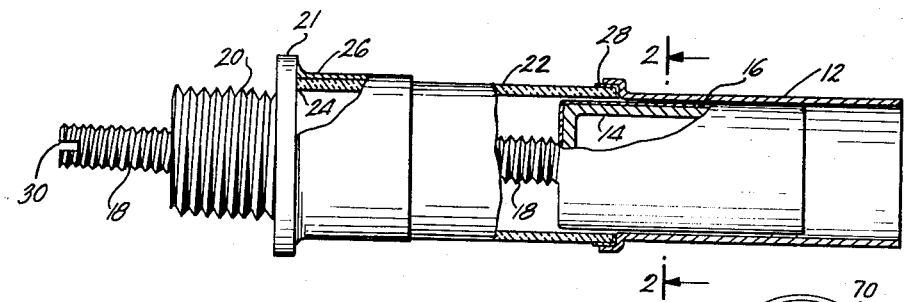
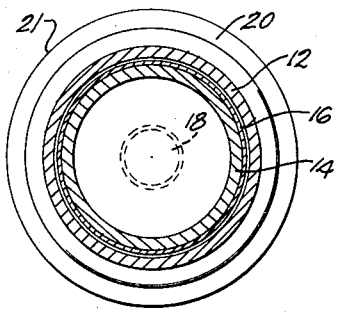
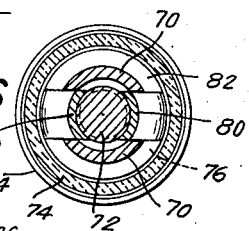
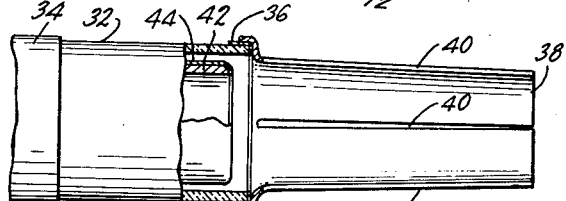
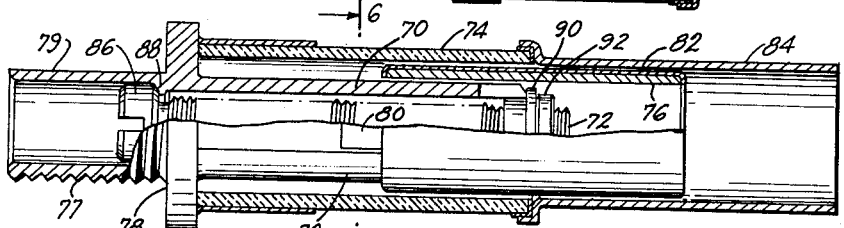
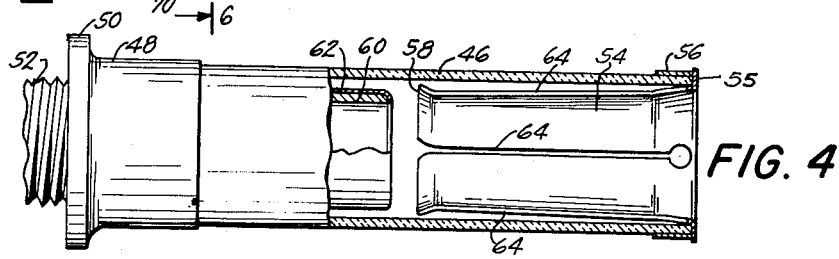
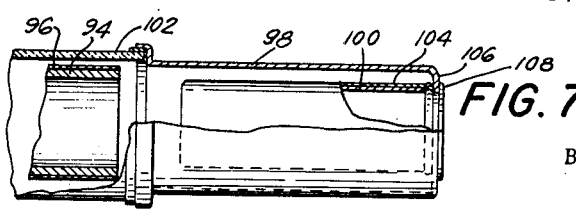
INVENTORS
MARTIN J. BLICKSTEIN
MARTIN A. MITTLER
BY James and Franklin
ATTORNEYS United States Patent Office 3,196,331
Patented July 20, 1965

3,196,331
PISTON TRIMMER CAPACITOR
Martin J. Blickstein and Martin A. Mittler, Flushing, N.Y., assignors, by mesne assignments, to Voltronics Corporation, Hanover, N.J., a corporation of New Jersey
Filed Oct. 22, 1962, Ser. No. 232,186
8 Claims. (Cl. 317—249)

This invention relates to small capacitors, and more particularly to piston trimmer capacitors.

A primary object of the invention is to generally improve piston trimmer capacitors. The usual capacitor of this type has a ceramic cylinder on which metal is coated to provide a stationary plate, and within which a metal piston is moved coaxially. For purposes of the present specification the term ceramic is intended to also include glass, and the term is so used hereinafter. Such capacitors are not as precise as might be desired because the ceramic cylinder cannot be made a precision part except at prohibitive expense. One object of the present invention is to overcome this difficulty, which is done by making both plates out of metal which is thick enough to be self-supporting in configuration, and the dielectric therebetween is provided by a thin ceramic coating which is vitrified on one of the plates. In preferred form the thin coating is a glass film vitrified on the outside of the piston. With this new construction the dielectric may be made very much thinner than before, thereby greatly increasing the capacitance. Another advantage is that the ceramic coating may be made more precise in dimension and configuration than is the case with a self-supporting ceramic body. Moreover, with the coating on the outside of the piston, it is accessible for machining or grinding should even greater accuracy or/and thinness be desired.

A ceramic material such as glass has great strength in compression. The coated piston may be operated in actual contact with the stationary cylindrical plate, thereby reducing the air gap and reducing any error which may arise because of imperfect alignment or concentricity as between the screw and the piston. In accordance with a further feature and object of the invention the air gap may be further reduced by making the stationary plate of the collet type, it being less in diameter than the piston, but longitudinally slit so that it can expand to receive the piston as the piston is moved therethrough.

Another object of the invention is to minimize possible deviation or error, for which purpose the piston may be made non-rotatable, as described in our copending application Serial No. 198,800, filed May 31, 1962, and entitled "Piston Trimmer Condenser." For this purpose the stationary bushing of the capacitor has slide rods extending in axial direction collaterally of the lead screw, these slide rods passing into and engaging a part of the piston as to prevent rotation of the piston when the lead screw is rotated.

Still another object of the invention is to provide a modified form of capacitor having still higher maximum capacitance. For this purpose a second stationary metal cylinder of smaller diameter is secured to the end of the first stationary metal cylinder, and is disposed reentrantly and coaxially of the first cylinder. This second or reentrant cylinder is previously coated with a thin vitrified ceramic coating, and is dimensioned to fit inside the piston, much as the coated piston fits inside the first or larger diameter metal cylinder. Thus the coated piston moves axially between two stationary cylindrical plates, thereby increasing the capacitance of the trimmer.

To accomplish the foregoing objects, and other more specific objects which will hereinafter appear, the present invention resides in the piston trimmer capacitor elements and their relation one to another, as are hereinafter more particularly described in the following specification. The specification is accomplished by a drawing in which:

FIG. 1 is a partially sectioned elevation of the form of piston trimmer capacitor embodying features of the present invention;

FIG. 2 is a transverse section taken approximately in the plane of the line 2—2 of FIG. 1;

FIG. 3 is a fragmentary section like the right hand part of FIG. 1, but shows a modification in which the stationary plate is of the collet type;

FIG. 4 is a partial longitudinal section, as in FIG. 1, but shows a stationary plate of the collet type which is reentrantly disposed at the end of a long insulator;

FIG. 5 is a longitudinal section through another form of the invention, in which the piston is non-rotatable;

FIG. 6 is a transverse section taken approximately in the plane of the line 6—6 of FIG. 5; and FIG. 7 is a fragmentary section corresponding to the hight-hand portion of FIG. 1, but showing another form of the invention in which the piston moves between two coaxial stationary plates.

Referring to the drawing, and more particularly to FIGS. 1 and 2, the piston trimmer capacitor has relatively movable plates 12 and 14, which are made of metal thick enough to be self-supporting in configuration. The dielectric 16 therebetween is a thin ceramic coating which is vitrified or "fired" on one of the metal plates, preferably on the plate 14. Thus, in FIG. 1 the capacitor comprises a stationary metal cylinder 12, a metal piston 14 having a thin vitrified ceramic coating 16 thereon, and a lead screw 18 for moving the piston 14 axially relative to the stationary cylinder 12.

Considered in greater detail, the capacitor comprises a stationary metal bushing 20, and an insulator tube 22 having its end 24 secured to the flange 21 of the bushing 20, as by means of solder indicated at 26, and having the stationary metal plate 12 secured to its other end, as by means of solder indicated at 28. The piston 14 is coaxial with the insulator 22 as well as the stationary plate 12, but in the present structure the internal diameter of insulator 22 may be substantially greater than that of the piston, and therefore the insulator 22, which is preferably a ceramic tube, need not be a precision part. The metal parts 12 and 14 are much more readily made precise in dimension and configuration than would be the case with ceramic parts.

The dielectric 16 is a thin coating, and is therefore readily made more precise than would be the case with a relatively thick self-supporting ceramic tube. Moreover, because the coating is on the outside of the piston it is readily accessible for grinding to even greater thinness and more precise dimension and cylindricity, when desired. We prefer at this time to use glass, because it may be fired on the metal piston at lower temperature and therefore with less difficulty than is the case with other ceramics. With this difficulty surmounted, other ceramics may be preferred to glass.

The lead screw 18 may be formed integrally with or may be attached to the piston 14. It passes through the bushing 20, and in the present case, is threadedly received in the bushing, so that rotation of the lead screw, as by means of a screw driver received in slot 30, moves the piston axially in order to vary the capacitance. The insulator 22 may be made long enough for complete withdrawal of the piston from the stationary plate 12, but in this respect the design may be varied depending on the desired range of capacitance variation wanted.

The ceramic coating may have a thickness of say 0.002 inch whereas a ceramic tube as previously used might have a thickness of say 0.020 inch, thereby providing a substantial increase in capacitance in the present device, say from a maximum of say 90 mmf. to a maximum of say 500 mmf. The clearance or air gap between the piston and the stationary plate may be reduced to a matter of say five or even one ten thousandth of an inch. The clearance between the piston and the stationary plate has been exaggerated in the drawing for the sake of clarity. The dimensions given are given solely for illustration are not intended to be in limitation of the invention.

Although not shown, it will be understood that bushing 20 may be fitted with appropriate anti-backlash means, if desired.

One advantage of the present construction is that the coated piston may be made to fit the cylinder 12 very closely. This is true despite the possibility of slight error in the lead screw 18, and results from the fact that ceramic materials, when bonded to a rigid support, are strong even though thin. This fact may be taken advantage of to insure an even closer fit between the stationary plate and the piston by making the plate of the collet type.

This is shown in FIG. 3 in which the insulator 32 is secured at one end to a bushing, not shown, as by means of solder 34, while its other end is soldered at 36 to stationary plate 38. The latter is reduced in diameter relative to the piston, and in the present case is made of a somewhat resilient metal, and is tapered toward its free end. It is slit longitudinally, in the present case with four slits indicated at 40, and therefore is capable of expanding as the piston 42 is moved therethrough. As before, the piston 42 is made of metal, and has a thin ceramic coating 44 vitrified thereon.

If desired, the stationary plate may be made reentrant, and such a construction is shown in FIG. 4 of the drawing. Here again an insulator tube 46 is soldered at 48 to the flange 50 of a stationary metal bushing 52, but in this case the insulator 46 is lengthened. The stationary metal plate 54 is disposed reversely or reentrantly inside the insulator 46, the flanged outer end 55 of the plate 54 being soldered to the insulator 46 as indicated at 56. In the present case the plate 54 is of the collet type, and tapers toward the left, except that its inner end is flared outwardly as shown at 58 to ease entrance of the metal piston 60, the latter being coated with ceramic as indicated at 62. Stationary plate 54 is longitudinally slit at 64, so that the plate can expand to receive the piston when the piston is advanced by the lead screw. There are a plurality of such slits, and in the present case four slits are used.

As so far described it is assumed that the piston rotates with the lead screw. However, the piston may be made non-rotatable as described in our copending application, previously referred to. Such a construction is shown in FIGS. 5 and 6 of the drawing, referring to which there are one or more, in this case two metal slide rods 70, which extend in axial direction collaterally of the lead screw 72, and within the insulator 74. The slide rods 70 pass into and so engage a part of the piston 76 as to prevent rotation of the piston when the lead screw 72 is rotated.

In the preferred form the slide rods 70 are arcuate in cross section, and may be formed as a tubular extension of the stationary bushing 78, the said tubular extension being slotted at diametrically opposed sides to form the separate slide rods 70. The left end of the piston has an internally threaded neck 80 which engages the lead screw, the latter being held against axial movement, and itself causing axial movement of the piston. The end of the piston is cut away to clear the slide rods 70, and the neck 80 then is separated into two parts which may be pressed radially toward one another for a snug frictional fit on the lead screw 72. The relationship permits accurately controlled sliding movement of the piston, but prevents rotation thereof.

The piston has a thin coating of vitrified ceramic dielectric, indicated at 82, and this is received with a close fit within the stationary metal cylinder 84, the latter being soldered to and forming an extension of the insulator 74, much as previously described for FIG. 1.

The lead screw may be held against axial movement in a number of ways. In the present case its slotted head 86 bears against a mating part 88 of the bushing 78, and near its opposite end there is a stationary slip ring 90 bearing against the inner rods of the slide rods 70. The slip ring 90 is engaged by a collar or stop bushing 92 which is screwed on the end of lead screw 72 far enough to take up backlash, and to provide a desired amount of friction, whereupon the adjustment is locked, as by mutilating the thread outside the collar 92.

Bushing 78 is threaded at 77, and has a flat at 79, for panel mounting. In FIGS. 1 and 4 the parts 20 and 52 also may have a flat to prevent rotation. For mounting on printed circuitry the threaded part may be eliminated, and the stationary body is provided with lead wires which depend from the ends of the body and act as supports for the capacitor as well as electrical connection thereto.

Still another form of the invention is shown in FIG. 7. In this form the piston 94 with its thin ceramic coating 96 is movable axially between two stationary plates 98 and 100. The first stationary plate 98 corresponds to those previously described, and is similarly secured to one end of an insulator 102. The second stationary plate 100 is preliminarily coated with a thin dielectric coating indicated at 104, and is then secured on the end 106 as shown at 108, to the first stationary plate 98. It will be seen that when the piston is moved toward the right the dielectric 104 is disposed between the inner plate 100 and the piston 94, and the dielectric 96 is disposed between the piston 94 and the outer plate 98. The capacitor then has three plates instead of two, thereby greatly increasing the capacitance thereof. The piston may be moved as previously described, either by means of a lead screw like that shown in FIG. 1, which rotates the piston, or by means of a lead screw like that shown in FIG. 5, which rotates without turning the piston.

The dielectric coating 104 is on the outside of its metal cylinder 100, and may be machined or ground, if desired, before assembling it with the outer cylinder 98. The part 100 is made like a conventional drawn metal eyelet. It is provided with a bead or collar, which placed against the end wall 106, and the outer end of plate 100 is then flanged or riveted outwardly against wall 106.

It is believed that the construction and operation of our improved trimmer capacitor, as well as the advantages thereof, will be apparent from the foregoing detailed description. One main advantage of the vitrified ceramic coating is that it may be made very thin thus leading to higher capacitance value without increasing the size of the capacitor. We have found that in this way, a tenfold increase in capacitance is obtainable.

A further advantage is that the dielectric may be made accurate in size and configuration, at minimum expense. Moreover, for more precise work, the coating may be machined or ground, and this is readily done because it is on the outside of the metal piston. The usual tubular ceramic dielectric would require machining on the inside, which is difficult and expensive. The ceramic coating, although thin, is strong because it is bonded to metal. It therefore may be operated in actual contact with a stationary plate, with no significant air gap therebetween.

It will be understood that while we have shown the invention in several preferred forms, changes may be made without departing from the scope of the invention, as sought to be defined in the following claims.

We claim:

1. A piston trimmer capacitor comprising a metal bushing, an insulator tube having one end secured to said bushing, a stationary cylindrical metal plate secured to the other end of the insulator tube and having a metal cylinder of small diameter secured to the end remote from the bushing and disposed reentrantly and coaxially therein, said metal cylinder being coated with a thin ceramic dielectric coating, a metal piston coaxially positioned within said stationary metal plate and dimensioned to slideably fit around the outside of said metal cylinder, a lead screw passing through said bushing and connected to said piston for moving the same axially and a thin ceramic dielectric coating on said piston.

2. Piston trimmer capacitor according to claim 1 in which said thin, ceramic dielectric coatings are fused glass coatings.

3. A piston trimmer capacitor comprising a stationary metal cylinder, an insulator tube having a bushing at one end portion and secured to said stationary metal cylinder at the other end portion, a metal piston having a thin integral coating of glass fused thereon coaxially positioned within said cylinder, said thin integral coating of glass precision fitting the inner wall of the cylinder, and a lead screw for axially moving the piston relative to the stationary cylinder, said lead screw passing through said bushing.

4. Piston trimmer capacitor according to claim 3 in which said stationary metal cylinder is of the collet type being reduced in diameter relative to said piston and being longitudinally slit so that it can expand to receive the piston as the piston is moved therethrough.

5. Piston trimmer capacitor according to claim 4 in which said stationary metal cylinder is formed as an outward extension of said insulator tube.

6. Piston trimmer capacitor according to claim 4, in which said stationary metal cylinder is positioned reentrantly in said insulator tube.

7. The piston trimmer capacitor according to claim 3 including means engaging a portion of said piston to prevent rotation thereof as the same is moved axially.

8. A piston trimmer capacitor as defined in claim 3, in which the stationary metal cylinder has a second, stationary metal cylinder secured to the end remote from the bushing and disposed reentrantly and coaxially of the first cylinder, said second cylinder having an exterior dielectric coating, and said metal piston has a hollow cylindrical interior surface of a diameter slightly larger than that of the coated second cylinder, and disposed coaxially therewith, whereby the coated hollow piston moves axially between the first and second stationary cylinders, thereby increasing the capacitance of the capacitor.

References Cited by the Examiner
UNITED STATES PATENTS

| | | | |
|---|---|---|---|
| 2,324,178 | 7/43 | Sprague et al. | 317—249 |
| 2,641,647 | 6/53 | Wallin | 317—249 |
| 2,794,159 | 5/57 | Wadsworth | 317—249 |
| 3,051,879 | 8/62 | Lazar et al. | 317—249 |

JOHN F. BURNS, *Primary Examiner.*

JOHN P. WILDMAN, *Examiner.*